May 30, 1933. H. ROSENBERG 1,912,100
ANCHORAGE DEVICE
Original Filed Feb. 11, 1928

Inventor:
HEYMAN ROSENBERG
By Edgar M Kitchin
his Attorney

Patented May 30, 1933

1,912,100

UNITED STATES PATENT OFFICE

HEYMAN ROSENBERG, OF NEW YORK, N. Y.

ANCHORAGE DEVICE

Original application filed February 11, 1928, Serial No. 253,755. Divided and this application filed June 19, 1931. Serial No. 545,606.

This invention relates to improvements in the art of anchorage especially to inaccessible or difficulty accessible work, and has as its primary object the combining of facility with effectiveness of anchorage.

A further object is provision for adjustment and variability of relative location of the anchorage.

More specifically, the invention comprehends means of purchase for an anchorage element, which means of purchase is adapted for relative variability of position without dislocation to an inoperative condition.

Among the further objects of the present invention is the anchorage of means of purchase from the accessible side of a wall or like work to the inaccessible side thereof.

Also, a still further object in view is the ready, easy, and effective introduction of such means of purchase to the inaccessible side of work from the accessible side thereof in a manner to cause anchorage of the means of purchase of such form as to permit variable accessibility.

With these and other objects in view, as will in part hereinafter be stated and in part become apparent, the invention comprises certain novel constructions, combinations, and arrangements of parts as will hereinafter become apparent and be subsequently pointed out in the appended claims.

In the accompanying drawing,—

Figure 1:
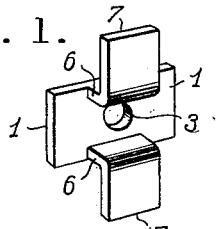
Figure 1 is a perspective view of an embodiment of the present improved anchor-receiver detached.
Figure 2:
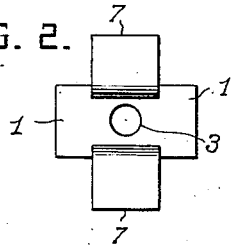
Figure 2 is a side elevation thereof.

In various industrial arts, such as automobile body construction, cornice work, ventilation ducts, and other sheet metal and like wall construction, it frequently occurs that anchorage must be had to a wall whose inner surface is either wholly inaccessible or accessible only with difficulty, and, in such instances, there may be used some form of anchorage device such as the types covered by my several United States Letters Patent numbered and dated respectively: 1,299,232, dated April 1, 1919; 1,411,184, dated March 28, 1922; 1,465,148, dated August 14, 1923; 1,482,151, dated January 29, 1924; 1,485,202, Dated February 26, 1924; 1,526,182, dated February 10, 1925; 1,545,471, dated July 7, 1925.

Such anchorage devices are especially effective for this class of work, but it sometimes occurs that a further difficulty arises from the fact that a sheet, strip, or other part or wall is to be anchored to another sheet, strip, wall, or other work having an inaccessible or inner surface, and that definite spacing of the anchorage screw or pin in the superposed or exterior work is required. Even with the most careful templets, it is not always practicable to have apertures formed in the inner and outer pieces of work which register with precision, as, for example, when applying molding to the casing of a window frame in an automobile body structure. In such instances the anchorage pin or screw, when passed through a previously formed aperture in the molding or superposed work, may miss the aperture in the inner wall just enough to prevent making the needed connection or may just engage at the tip in a manner to cause the screw or anchorage pin to cant in approaching the seated position. It becomes desirable in such instances, therefore, to provide some means of purchase to the inner wall which is susceptible of at least a slight amount of floating movement or relative adjustability, so that an approaching entering tip of a fastening screw or pin will cause the purchase means to shift or float to a proper alinement and enable the production of an effective anchorage even when the pin or screw receiving apertures would not otherwise accurately register.

In such cases, attempts have been made to provide supplemental anchorage means, but so far as known to me, such attempts have not been successful for various reasons. One of such reasons lies in the difficulty of retaining a supplemental anchorage means or purchase means in place while leaving it free to float pending application of the anchoring screw or pin. The present invention overcomes all these difficulties and provides for successful anchorage including engagement with the inaccessible or inner face of the main or inner wall and at the same time provides a floating purchase means capable of such variations in location as may be required in practice.

For the detailed understanding of the invention, reference is had to the accompanying drawing, in which 1 indicates the anchorage plate of the improved purchase means. Plate 1 engages the inner face of a wall or work 2. Plate 1 is apertured at 3 to receive an anchoring screw 4. Extending laterally from the middle areas of the edges of plate 1 are wings, each bent at 6, 6, to provide an offset the thickness of wall 2, and each terminating in a foot 7 beyond the offset 6 to overlie wall 2 while plate 1 underlies said wall when the parts are assembled. Wall 2 is formed with an aperture 8 of a width corresponding to the width of plate 1 to permit snug passage of the plate through the aperture, but sometimes aperture 8 will be slightly wider and permit lateral play and result in the final assemblage of Figure 8, as hereinafter mentioned. Aperture 8 is of a length substantially equal to the length of that part of plate 1 from one end thereof to approximately the remote edges of the lateral wings forming feet 7.

Figure 6:
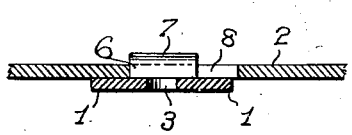
Figure 6 is a view similar to Figure 4 with the anchorage screw and additional or anchored work omitted and with the purchase means in the position as initially introduced to engage with the apertured wall.
Figure 4:
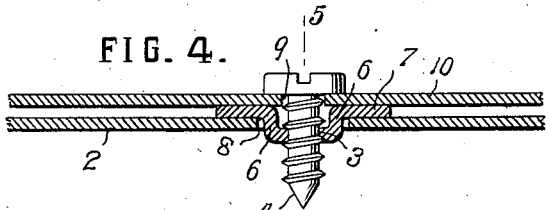
Figure 4 is a section through the work seen in Figure 3 with the purchase means of Figure 1 applied and a further piece of work anchored to the purchase means.
Figure 5:
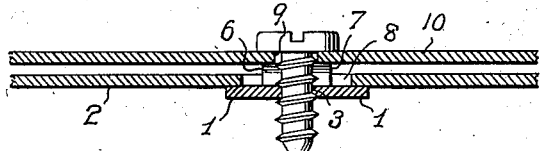
Figure 5 is a view similar to Figure 4 with the section taken at right angles, as indicated by line 5—5 of Figure 4.

To assemble the purchase means of Figure 1 with work, one end of plate 1 is inserted through aperture 8 and moved to a position underlapping wall 2 as much as possible, and then plate 1 is moved through aperture 8 with a swinging face-wise movement to the position seen in Figure 6. Feet 7 remain at the outer face of wall 2, and plate 1 is slid back until there is less underlap at the left end, as seen in Figure 6, and some underlap of wall 2 at the righthand end of aperture 8. When thus centered, plate 1 is in the position seen in Figure 7 and is ready to receive the anchoring screw 4 in the aperture 3. The assemblage to the condition of Figures 4 and 5 is accomplished after the centering of plate 1, by merely applying the strip, plate or other work 10 face-wise to wall 2 and inserting screw 4 through an aperture 9 in work 10 and into aperture 3, and threading the screw to a seated position firmly and effectively clamping the parts together.

Figure 7:
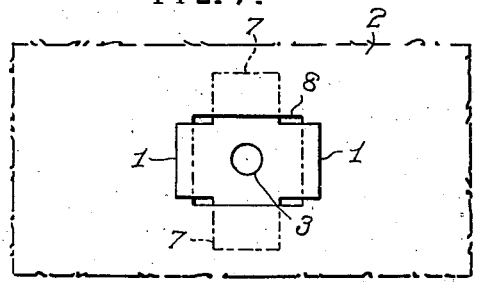
Figure 7 is a view in side elevation of the parts seen in Figure 6 with the purchase means shifted to the fully engaged position, the parts being seen from the interior or inaccessible side of the wall or other work.
Figure 8:
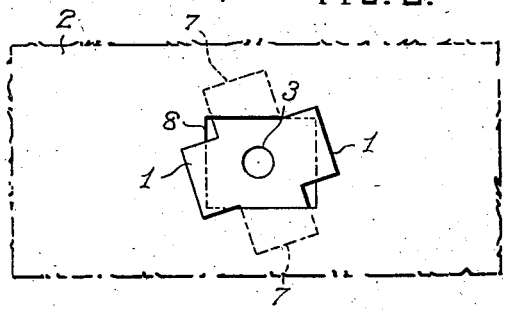
Figure 8 is a view similar to Figure 7 with the purchase means shown in a canted or skewed position.

It will thus be seen, that plate 1 is located for effective anchorage to the inaccessible inner surface of wall 2 by approaching the wall from the exterior, and if the plate 1 remains centered, the final location will be as seen in Figure 7; but, if aperture 8 in any given case should be slightly wider than the width of plate 1, (as it is likely to be in many cases to facilitate ease of assemblage) the plate 1 is liable to assume the skewed position of Figure 8, which, of course, is immaterial because plate 1 is never seen after application, and the anchorage will be just as effective when skewed as when otherwise. Also, under some conditions, variation of the location of aperture 8 may result in location of plate 1 as seen in Figure 6, with all the underlap at one end of aperture 8. This also will not prevent an effective anchorage, as plate 1 cannot possibly escape through aperture 8 unless rocked or swung, which movement is not possible so long as screw 4 and part 10 remain in place.

Figure 9:
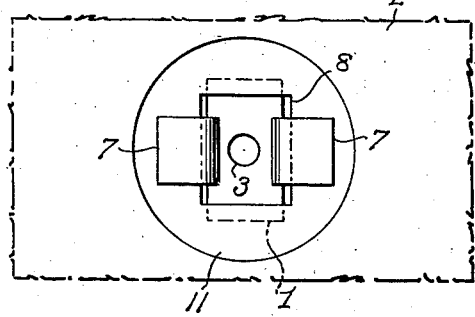
Figure 9 is a view similar to Figure 7 of the opposite face of the wall, the wall being shown as slightly modified in construction.
Figure 3:
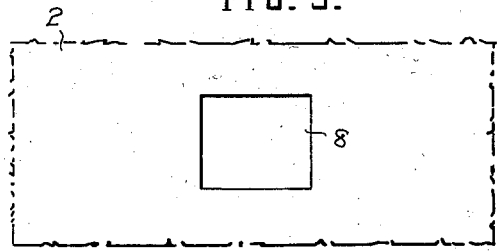
Figure 3 is a side elevation of a fragment of wall or like work apertured to receive the purchase means seen in Figures 1 and 2.
Figure 10:
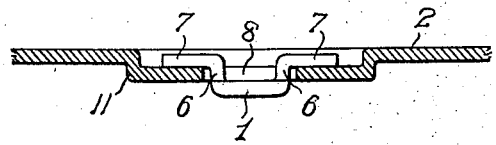
Figure 10 is a sectional view through the wall seen in Figure 9 taken approximately across the center of the floating purchase means but with said means shown in edge elevation.

Of course, aperture 8 may be formed in a perfectly flat wall 2, or an offset 11 may be provided to accommodate the feet 7, as seen in Figures 9 and 10. It is important that the feet 7 extend substantially at right angles to the main body or plate 1, so that the parts will effectively cooperate with a properly proportioned opening 8 in the wall, as above indicated.

There is a very substantial advantage provided in the present invention from the fact that the purchase-affording means are designed to be applied easily and quickly from the exterior and to remain in place indefinitely before being used. Multiple assemblage is thus facilitated.

Plate 1 is an anchorage-means receiver, in the sense of affording the needed purchase for the anchoring screw, and while said plate becomes in fact a nut or the equivalent thereof during use, it is of course obvious that other anchorage means and other forms of provision for purchase may be provided within the scope of the invention.

The invention of this application is distinguished from the subject matter of my co-pending applications, Serial Nos. 75,830 and 75,831, filed December 16, 1925, in that said co-pending applications disclose structures wherein no floating of the anchorage receiving means is provided for.

It should be understood from reference to my above-identified patents that the screw 4 has its threads hardened sufficiently for entering metal such as soft iron or soft steel, substantially without injury to the threads, so that the entering of the purchase means is effected with great facility.

This application is a division of my co-pending application Serial No. 253,755, filed February 11, 1928 and issued Aug. 4, 1931, as Patent No. 1,817,584.

What is claimed is:

1. A purchase device for anchorage means for anchorage to a wall section in an aperture of such wall section where the aperture is substantially an oblong rectangle or the equivalent in shape, the purchase device comprising a plate of greater length than width and of greater length and less width than the respective length and width of the aperture of said wall section, said plate having laterally outstanding wings offset facewise from the plate a distance substantially equal to the thickness of said wall section, the wings being of substantially the same width as the plate and being located for having their relatively remote edges spaced from one end of the plate a less distance than the length of the aperture of the wall section, whereby the wings are located and proportioned with respect to the plate and said aperture to enable the wings to be threaded through the aperture with an edgewise shifting movement and being incapable of escaping through said wall section otherwise than by such shifting movement, and the wings being proportioned and located to lie at one face of the wall section while the plate lies at the other face thereof when applied in the wall section by such edgewise shifting movement, and the plate having means for receiving anchorage means retaining the plate against such edgewise shifting.

2. A fabricated structure comprising an apertured wall section, a purchase device for anchorage means having a plate of greater length and less width than the respective length and width of the aperture in the wall section and having laterally outstanding wings offset from the plate a distance substantially equal to the thickness of the wall section, the wings being located for having their remote edge spaced from one end of the plate a less distance than the length of the aperture of the wall section, and the wings lying at one face of the wall section while the plate lies at the other, and anchorage means engaging the plate through the aperture in the wall section.

In testimony whereof I affix my signature.

HEYMAN ROSENBERG.